UNITED STATES PATENT OFFICE.

JOSEPH R. SANFORD, OF SALISBURY, CONNECTICUT.

PLASTIC COMPOSITION.

1,206,920.  Specification of Letters Patent.  Patented Dec. 5, 1916.

No Drawing.  Application filed November 27, 1915.  Serial No. 63,872.

*To all whom it may concern:*

Be it known that I, JOSEPH R. SANFORD, a citizen of the United States of America, residing at Salisbury, Connecticut, have invented a new and useful Plastic Composition, of which the following is a specification.

My invention relates to a new and useful plastic composition applicable for use in a wide variety of connections, for example, for shoe soles, tire treads and in other articles of manufacture requiring flexibility and at the same time toughness, tensile strength and resistance to cuts, punctures, breaks and wear. Another object of the invention is to produce a compound which will have the properties of rubber and which shall be substantially cheaper and lighter than pure rubber and which will, in the above respects, be superior thereto. In respect to traction, under certain conditions, my improved compound will be found to be far more efficient. This feature is one of great advantage in shoe soles and in vehicle tires.

My new compound may be made in sheets or molded to any desired shape and, of course, should be vulcanized to the appropriate degree depending upon the particular use for which the compound is to be employed.

My new compound comprises a base of vulcanizable material, such as rubber, through the mass of which is uniformly distributed relatively short lengths of textile fiber, so arranged as to cross each other in every direction, thus imparting to the finished product a substantially uniform tensile strength in every direction. The best results are obtained by employing a textile fiber which has been first properly cleaned and carded so as to remove all impurities, lumps and the like, whereby a more effective mixing of the fiber may be had, and whereby the finished product will possess the greatest uniformity.

In preparing the compound, the textile fibers are worked into and throughout the mass uniformly and evenly substantially as follows: Having first selected the particular textile fiber best adapted for the particular use that the finished compound is to be put to, such fiber is fed into a mass of rubber that has been brought to a substantially plastic state on mixing rolls, the said textile material being added evenly and worked into the plastic mass by repeating diagonal and cross lap folds in the material as it is passed through the mixing rolls. This diagonal or cross lapping results in the uniform distribution of the fibers throughout the entire mass but without regard to direction. Inasmuch as fibers lead in every direction, and in no one direction in particular, there is a uniformity of tensile strength in every direction. This method of manufacturing the compound also causes the fibers to be so worked into the vulcanizable material as to be effectively interlocked therewith. Again, this method of manufacture results in reducing any unusually long fibers to shorter lengths corresponding more closely to the other fibers in the mass. Thus, the surface appearance of any article made of said compound is highly improved and is free from lumps or other irregularities. When the mass of vulcanizable material has had distributed throughout it the desired amount of textile fiber to produce the mass of new compound, it may then be sheeted or molded to the desired form and then vulcanized to the desired extent.

It will be understood, of course, that the vulcanizing agents may be incorporated at any desired time.

What I claim is:

1. A plastic composition comprising a mass of vulcanizable material and a multitude of short untwisted textile fibers, said fibers being uniformly distributed throughout the entire mass and extending in every direction therein and being interlocked therewith, and being relatively short but of sufficient length to effectively reinforce said vulcanizable material to increase the tensile strength of said composition in all directions.

2. A plastic composition comprising a mass of rubber and a multitude of short untwisted textile fibers, said fibers being uniformly distributed throughout the entire mass and extending in every direction therein and being interlocked therewith and being relatively short but of sufficient length to effectively reinforce said mass of rubber to increase the tensile strength of said composition in all directions.

3. The process of manufacturing a new rubber compound comprising, wo...

mass of vulcanizable material into a substantially plastic state, then feeding into said substantially plastic mass a multitude of untwisted textile fibers, then mixing said fibers uniformly and in all directions throughout said mass by passing said mass with the fibers therein through mixing rolls by repeating diagonal and cross lap folds, whereby the longer fibers will be broken in length, and will be evenly distributed in all directions throughout said mass and will be interlocked with the vulcanizable material.

JOSEPH R. SANFORD.